(12) United States Patent
Gideon

(10) Patent No.: US 7,384,052 B2
(45) Date of Patent: Jun. 10, 2008

(54) SUSPENSION AND STEERING SYSTEM

(75) Inventor: Timothy A. Gideon, West Lafayette, IN (US)

(73) Assignee: Rowe Truck Equipment, Inc., Otterbien, IN (US)

( * ) Notice: Subject to any disclaimer, the term of this patent is extended or adjusted under 35 U.S.C. 154(b) by 171 days.

(21) Appl. No.: 11/327,911

(22) Filed: Jan. 9, 2006

(65) Prior Publication Data
US 2006/0208445 A1 Sep. 21, 2006

Related U.S. Application Data

(60) Provisional application No. 60/662,438, filed on Mar. 16, 2005.

(51) Int. Cl.
B60G 9/00 (2006.01)
(52) U.S. Cl. .............................................. 280/124.116
(58) Field of Classification Search ......... 280/124.116, 280/89.1, 89.11, 81.6, 86.5, 86.75, 124.109, 280/781, 785
See application file for complete search history.

(56) References Cited

U.S. PATENT DOCUMENTS 5,220,972 A    6/1993  Proia
5,234,067 A    8/1993  Simard
6,375,203 B1 * 4/2002  Warinner et al. .......... 280/81.6
6,866,295 B2 * 3/2005  Ziech et al. ................ 280/785
2006/0249922 A1 * 11/2006 Hinz .................... 280/124.116
2007/0145702 A1 * 6/2007  Booher ................ 280/124.116

* cited by examiner

Primary Examiner—Faye M. Fleming
(74) Attorney, Agent, or Firm—Frank D. Lachenmaier

(57) ABSTRACT

This invention relates generally to a unitized heavy duty axle suspension and steering system for self powered chassis. The steerable suspension system embodied in this invention takes advantage of the unique location and connection of the steering gear to the Pitman arm and its location and connection by the primary drag link to the bell crank assembly below and in-between the frame rails and above the axle. The primary drag link is the same length as the suspension arms and is located in a parallel plane to them when the vehicle is moving forward in a straight line. This unique arrangement virtually eliminates the phenomenon known as bump steer and allows the wheels to turn at a high degree of steer, dramatically increasing maneuverability for long wheel base chassis. The assembly with all of the steering controls and components between the rails and above the axle allow for unitized assembly and very straightforward installation.

1 Claim, 6 Drawing Sheets

SUSPENSION AND STEERING SYSTEM

CROSS-REFERENCE TO RELATED APPLICATION

Figure 1:
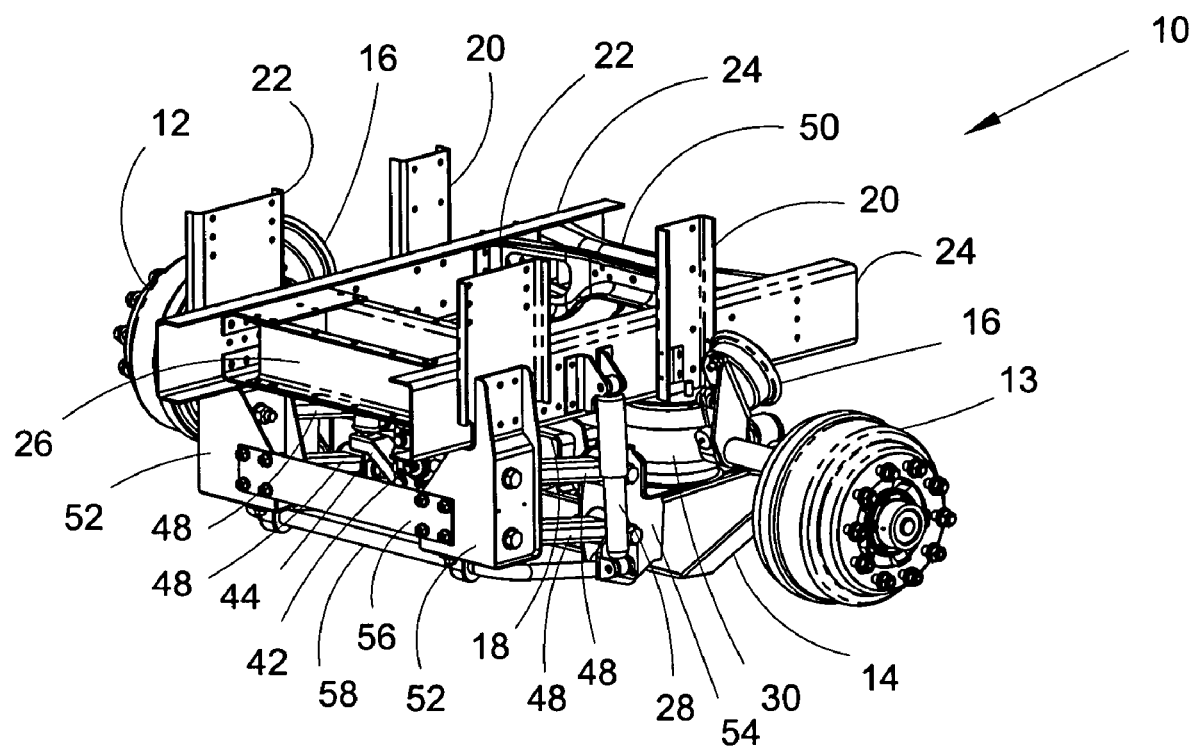

This application claims the benefit of Provisional Patent Application Ser. No. 60/662,438 filed Mar. 16, 2005.

BACKGROUND

1. Field of the Invention

This invention relates generally to a heavy duty axle unitized suspension and steering system for self powered chassis. The system embodied in this invention takes advantage of the unique location and connection of the steering gear to the Pitman arm and its location and connection by the primary drag link to the bell crank assembly, below and in-between the frame rails and above the axle. The primary drag link is located in a parallel plane and is the same length as the suspension arms when the trailer is moving forward in a straight line. This unique arrangement virtually eliminates the phenomenon known as bump steer and allows the wheels to turn at a high degree of steer, dramatically increasing maneuverability for long wheel base chassis.

Bump-steer is a change in toe angle caused by the suspension moving up or down. The effect of bump-steer is for the wheel to toe-in or toe-out when the suspension moves up or down. This toe change or "steering" occurs any time the suspension moves, whether it is from body roll, brake-dive, or hitting a bump in the road. Bump steer is undesirable because the suspension is steering the vehicle instead of the driver.

2. Prior Art

U.S. Pat. No. 5,220,972 Proia 1993 modifies existing self-tracking suspension systems that utilize toque rods to maintain the perpendicular orientation of the axle with respect to the center-line of the vehicle. Rubber bushings are installed on the ends of these torque rods to permit very limited angular movement as the vehicle turns. Multiple axle vehicles mount torque rods parallel to the longitudinal center-line of the vehicle body. This invention angles the forward ends of the torque rods inwardly towards the vehicle's center-line. Such angling of the torque rods allows the wheels to pivot as the trailer turns reducing wear on the drive tires and the road surface.

U.S. Pat. No. 5,234,067 Simard 1993 attempts to resolve long standing instability problems when dual axles are connected with leaf spring assemblies which are conventionally solved by the addition of torque rods as described in Proia above. His invention uses front and rear leaf-springs on each side that are aligned with each other and positioned forwardly and rearwardly of an equalizer beam. The front leaf-spring assembly has a front end pivotally attached by a pin to the vehicle frame and a rear end connected by a shackle to the front end of the equalizer beam. The rear leaf-spring assembly has a front end pivotally attached by a pin to the rear end of the equalizer beam and a rear end connected by a shackle to the frame of the vehicle. This allows road irregularity forces to be efficiently transmitted and stable without the use of torque rods.

SUMMARY

An object of the present invention is to provide a heavy duty axle suspension and steering system that eliminates bump steer for motor homes and self propelled travel trailers.

Another object of the present invention is to provide a heavy duty axle suspension and steering system that allows the wheels to turn at a high degree of steer, dramatically increasing maneuverability for long wheel base chassis.

A further object is to provide a heavy duty axle suspension and steering system that allows for a unitized construction that is economical to produce and install where all of the steering controls are inside the frame.

The present invention, in its several embodiments, meets the above mentioned objectives.

To provide a heavy duty axle suspension and steering system that eliminates bump steer, the steering gear is placed in-between and below the frame rails and above the axle where the primary drag link between the pitman arm and the bell crank assembly is the same length as the suspension arms and operates in a parallel plane to them.

To provide a heavy duty axle suspension and steering system that allows the wheels to turn at a high degree of steer, dramatically increasing maneuverability for a long wheel base chassis, the placement and geometry of the steering components allow for a performance similar to a parallel self-steer arrangement and the linkages work like a rack and pinion approach. The steering gear and linkage to the bell crank assembly allow for the intermediate drag link through the tie rod arm, to shift the orientation of the drive wheel and through the main tie rod link to the opposite tie rod arm, to cause the wheels to turn in unison.

Mounting the steering gear in-between and below the frame rails and above the axle allows for a unitized construction whereby the complete front wheel steering suspension system can be assembled and then simply mounted to the under carriage of a recreational vehicle or such by attaching the frame hangers to the longitudinally extending under side rails of the vehicle.

Still further objects and advantages will become apparent from a consideration of the ensuing description and accompanying drawings. In the description, reference is made to the accompanying drawings which form a part thereof, and in which are shown, by way of illustration, a specific embodiment in which the invention may be practiced. This embodiment will be subscribed in sufficient detail to enable those skilled in the art to practice this invention, and be understood that other embodiments may be utilized and that structural changes may be made without departing from the scope of the invention. In the accompanying drawings, like reference characters designate the same or similar parts throughout the several views.

DRAWINGS

Figure 2:
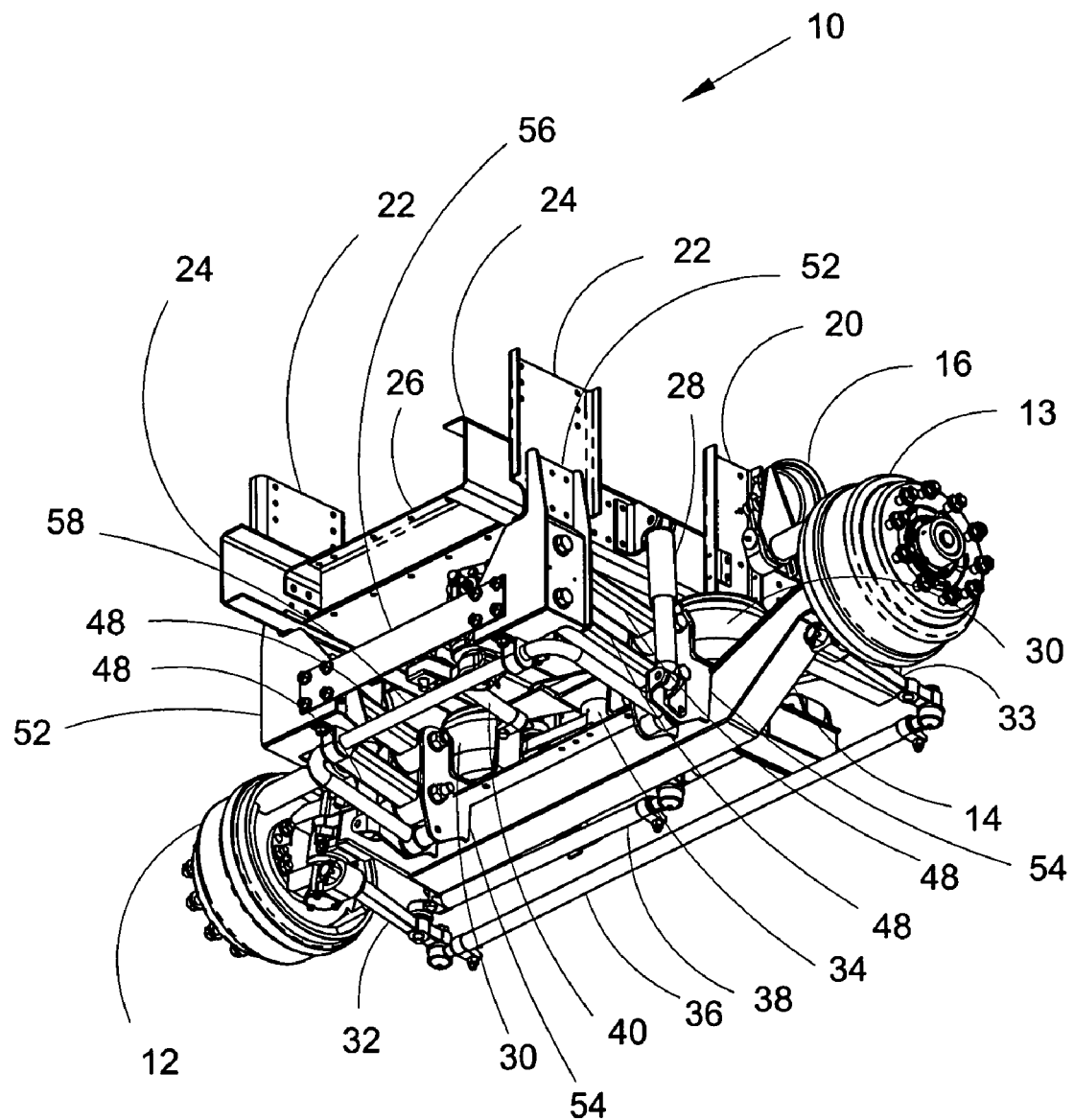
Figure 3:
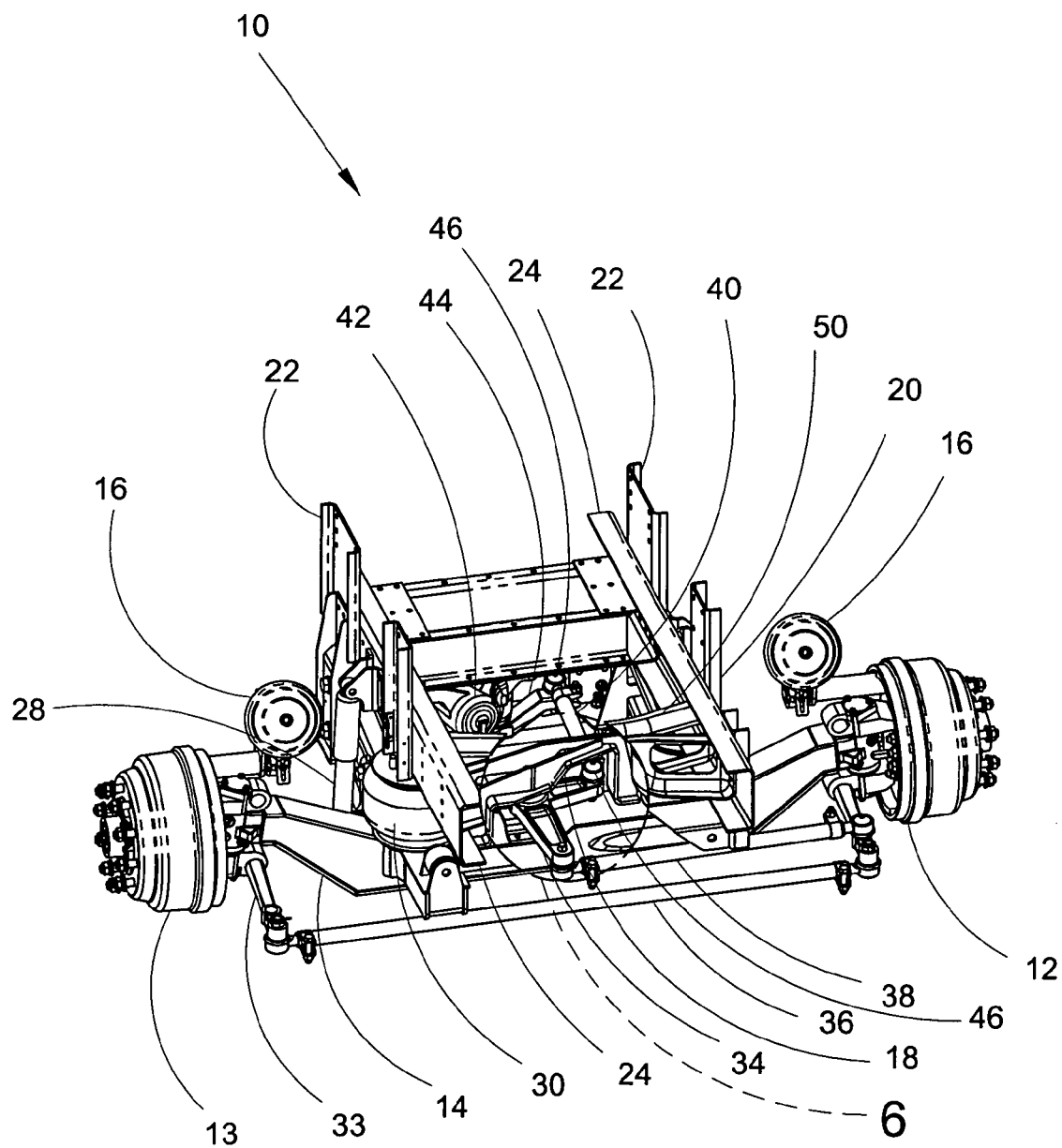
Figure 4:
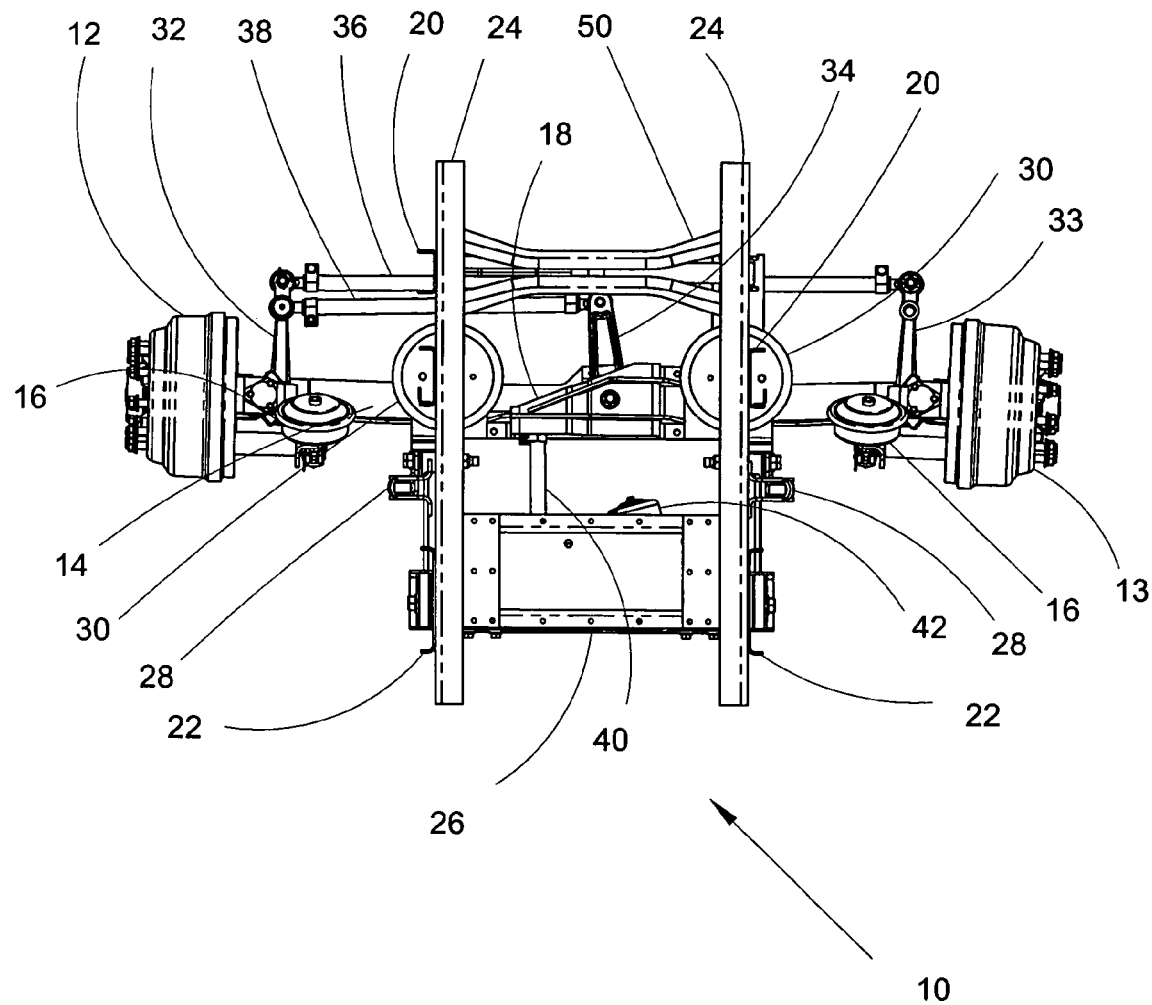
Figure 5:
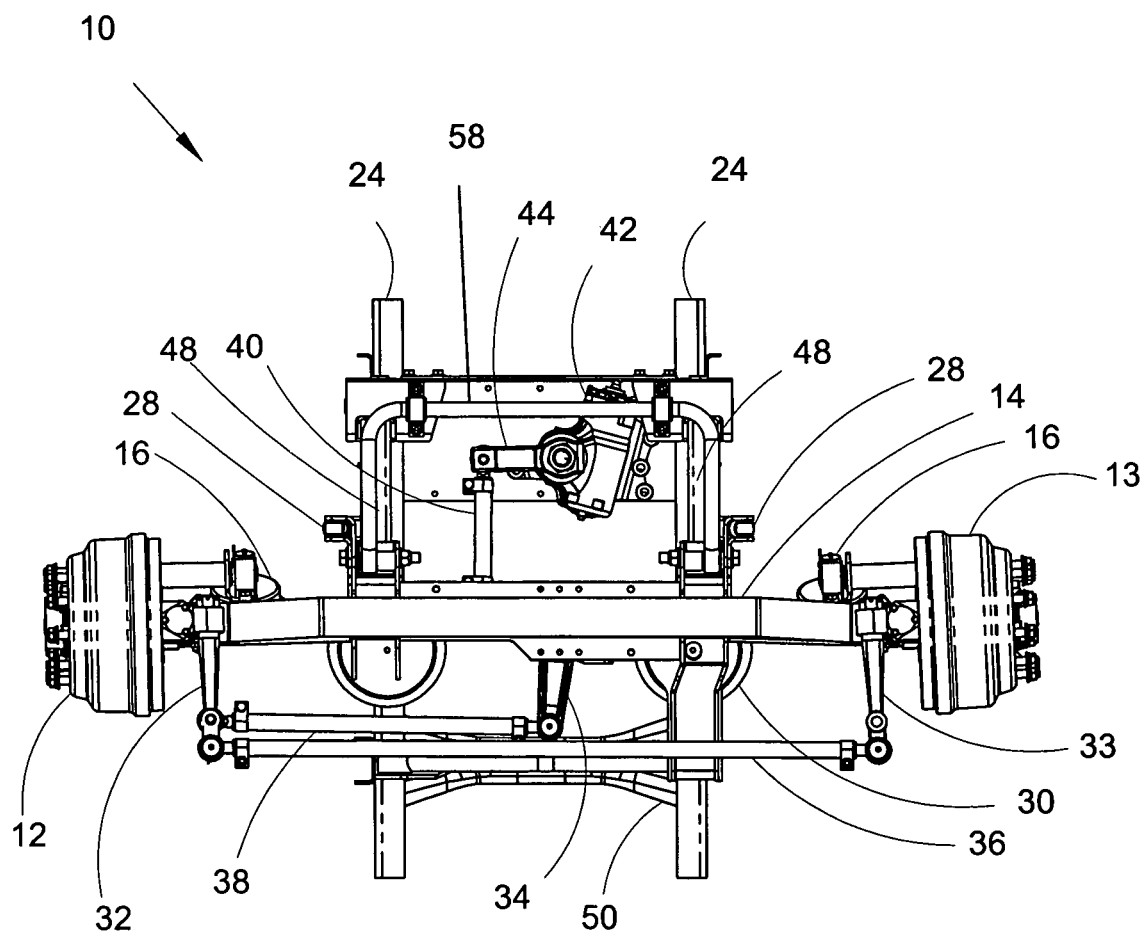
Figure 6:
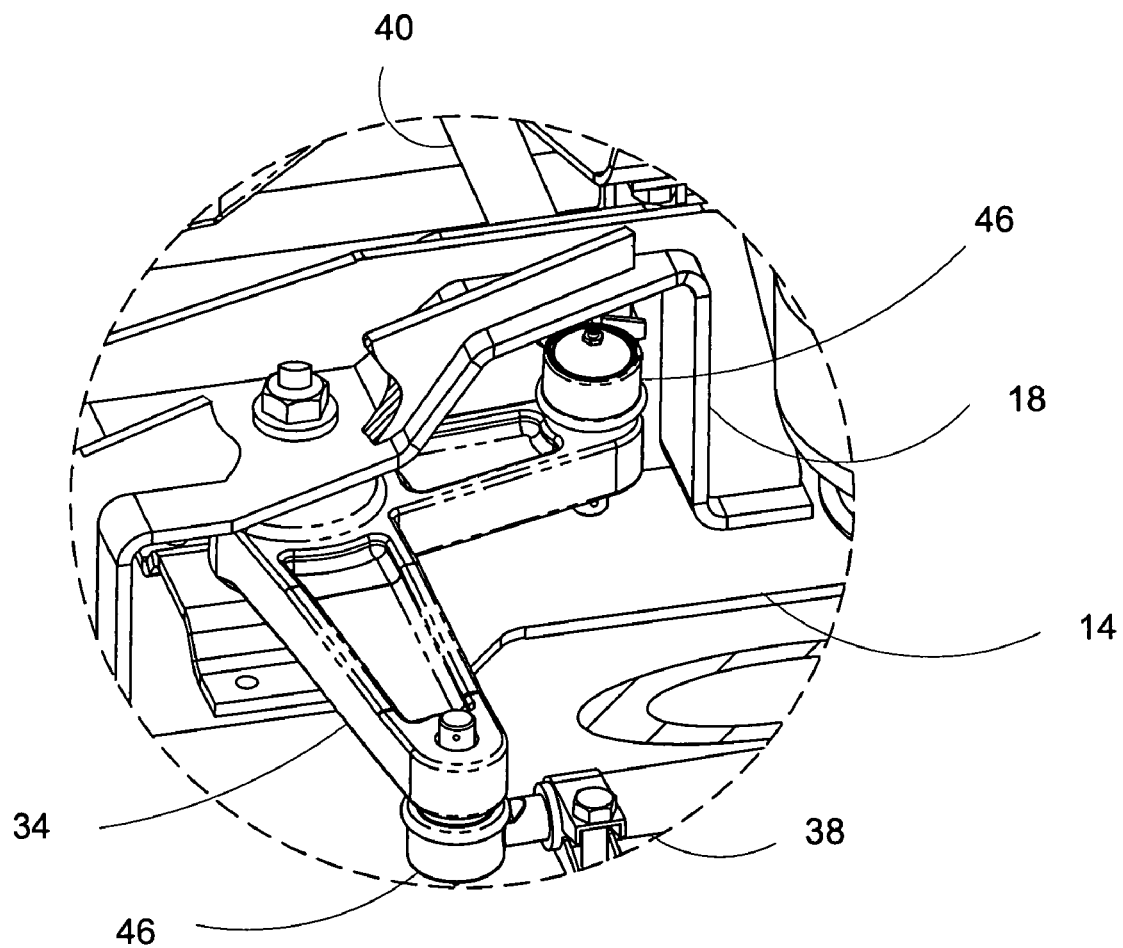

In order that the invention may be more fully understood it will now be described by way of example, with reference to the accompanying exemplary drawings in which:

FIG. 1 is a top front perspective view.
FIG. 2 is a bottom front perspective view.
FIG. 3 is a top rear perspective view.
FIG. 4 is a top view.
FIG. 5 is a bottom view.
FIG. 6 is an enlarged partial section of the top rear perspective view of FIG. 3 showing the mounting of bell crank on the under side of cover 18.

REFERENCE NUMERALS

The same reference numbers are used to refer to the same or similar parts in the various views.

10—suspension and steering System
12—drive wheel
13—wheel
14—axle
16—brake chambers
18—cover 20—rear frame hanger
22—front frame hanger
24—side rails
26—front cross brace
28—shock absorber
30—air spring
32—drive wheel tie rod arm
33—opposite tie rod arm
34—bell crank
36—main tie rod
38—intermediate drag link
40—primary drag link
42—steering gear
44—pitman arm
46—tie rod joint
48—suspension arm
50—rear cross brace
52—suspension arm frame brackets
54—suspension arm axle brackets
56—stabilizing brace
58—sway bar

DETAILED DESCRIPTION

The invention will now be described, by way of example, with reference to the accompanying drawings. FIGS. 1 through 6 illustrate a preferred embodiment of the present invention wherein a steerable front suspension system for a self propelled motor home type vehicle is disclosed.

Turning to FIG. 1, therein is shown a top rear perspective view of suspension and steering system 10 which is mounted to a vehicle's frame rails, not shown or part of this invention, positioned on opposite sides of the undercarriage of a vehicle, not shown or part of this invention, by fastening the tops of rear frame hangers 20 and front frame hangers 22 to the vehicle frame rails, not shown, toward the front of the vehicle, not shown. The bottoms of frame hangers 20 and 22 are attached to the outside of two parallel side rails 24 which are spaced apart by front cross brace 26 in the front and back cross brace 50 in the back. Suspension arm brackets 52 are suspended from the outside of front frame hangars 22 and axle 14 is pivotally connected to suspension arm brackets 52 by four suspension arms 48 and sway bar 58 and has shock absorbers 28 between side rails 24 and axle 14 on both sides and two air springs 30 mounted between the top surface of axle 14 and the under side of side rails 24.

FIG. 2 shows primary drag link 40 between the pitman arm 44 and the bell crank assembly 34 that it is the same length as the suspension arms 48 and operates in a parallel plane to them as axle 14 moves up and down with respect to frame rails 24 to compensate for road irregularities, its motion dampened and cushioned by shock absorbers 28 and air springs 30. Suspension arms 48 are pivotally mounted in suspension arm frame brackets 52 suspended from front frame hangers 22 and pivotally connected to axle 14 with suspension arm axle brackets 54. A stabilizing brace 56 is fastened between suspension arm frame brackets 52.

FIG. 3 shows steering gear 42 mounted to the bottom of front cross brace 26 and is pivotally connected to pitman arm 44 which connects through tie rod joint 46 to primary drag link 40 and through tie rod joint 46 at the opposite end to bell crank 34 as shown in FIGS. 3 and 6.

FIG. 4 shows bell crank 34 pivotally mounted above axle 14 to the underside of cover 18 and its connection at its distal end to intermediate drag link 38 through tie rod joint 46 to drive wheel tie rod arm 32. Rotation of steering gear 42 thus shifts the orientation of drive wheel 12 and through main tie rod 36 to opposite tie rod arm 33, causes both wheels 12 and 13 to turn in unison. FIG. 4 also shows brake chambers 16 mounted on the top and inside of each wheel.

FIG. 5 shows intermediate drag link 38 and main tie rod 36 are pivotally fastened to drive wheel tie rod arm 32 and are maintained in a common plane parallel to each other. Main tie rod 36 is shown linking tie rod arms 32 and 33.

FIG. 6 shows is an enlarged partial section view showing the pivotal mounting of bell crank 34 on the under side of cover 18 which is mounted to the top surface of axle 14 and its proximal connection to primary drive link 40 and its distal connection to intermediate drive link 38 using tie rod joints 46.

While this invention has been described with reference to an illustrative embodiment, it will be understood that this description is not limiting as to size, scale or construction materials. Rather, the scope of this invention is covered by the following claims.

What is claimed is:

1. A unitized axle suspension and steering system for self-propelled vehicles, RV's and travel trailers with longitudinally extending frame rails positioned on opposite sides and toward the front of the undercarriages of said vehicles, comprised of:
   a) two front and rear hangers having tops and bottoms, where said hanger tops are suspended from said longitudinally extending frame rails;
   b) said hanger bottoms are attached to the front and rear outside surface of two parallel side rails that have top and bottom surfaces;
   c) said parallel side rails that are laterally spaced apart by a front cross brace in front and a back cross brace in back;
   d) suspension arm frame brackets are attached to the outside of said front hangers and said bottoms of said parallel side rails and are supported at the lower front surface by a stabilizing brace that is attached between them;
   e) suspension arms are pivotally mounted in both of said suspension arm frame brackets and pivotally connected at the opposite end to suspension arm axle brackets which are fastened onto the front face of an axle;
   f) said axle with steerable wheels mounted on each end, one of which is a drive wheel and brake chambers mounted to the top inside of each of said wheels;
   g) air springs mounted between the top surface of said axle and said bottom surfaces of both parallel side rails;
   h) shock absorbers mounted between said suspension arm axle brackets and the outside of said parallel side rails;
   i) a steering gear mounted to the bottom of said front cross brace and pivotally connected to a pitman arm;
   j) said pitman arm, pivotally connected to the proximal end of a primary drag link;
   k) said primary drag link pivotally connected at the distal end to a bell crank and of the same length and operating in the same plane as said suspension arms;
   l) said bell crank pivotally mounted above said axle on the underside of a reinforced cover which is mounted on the top surface of said axle and between said parallel side rails and connected at its distal end to an intermediate drag link;

m) said intermediate drag link pivotally connected to a drive wheel tie rod arm such that when said steering gear is activated, said drive wheel orientation is shifted and a main tie rod connected between said drive wheel tie rod arm and opposite tie rod arm causes opposite wheel to turn in unison;

n) said intermediate drag link and said main tie rod pivotally fastened to said drive wheel tie rod arm and maintained in a common plane parallel to each other, whereby bump steer is eliminated, unitized construction is facilitated and the wheels are allowed to turn at a higher degree of steer, dramatically increasing maneuverability for long wheel base chassis.

* * * * *